Feb. 22, 1944.   L. W. EVANS ET AL   2,342,392
LOCATING AND SUPPORTING DEVICE FOR BOMB PARTS AND THE LIKE
Filed May 16, 1941   4 Sheets-Sheet 3
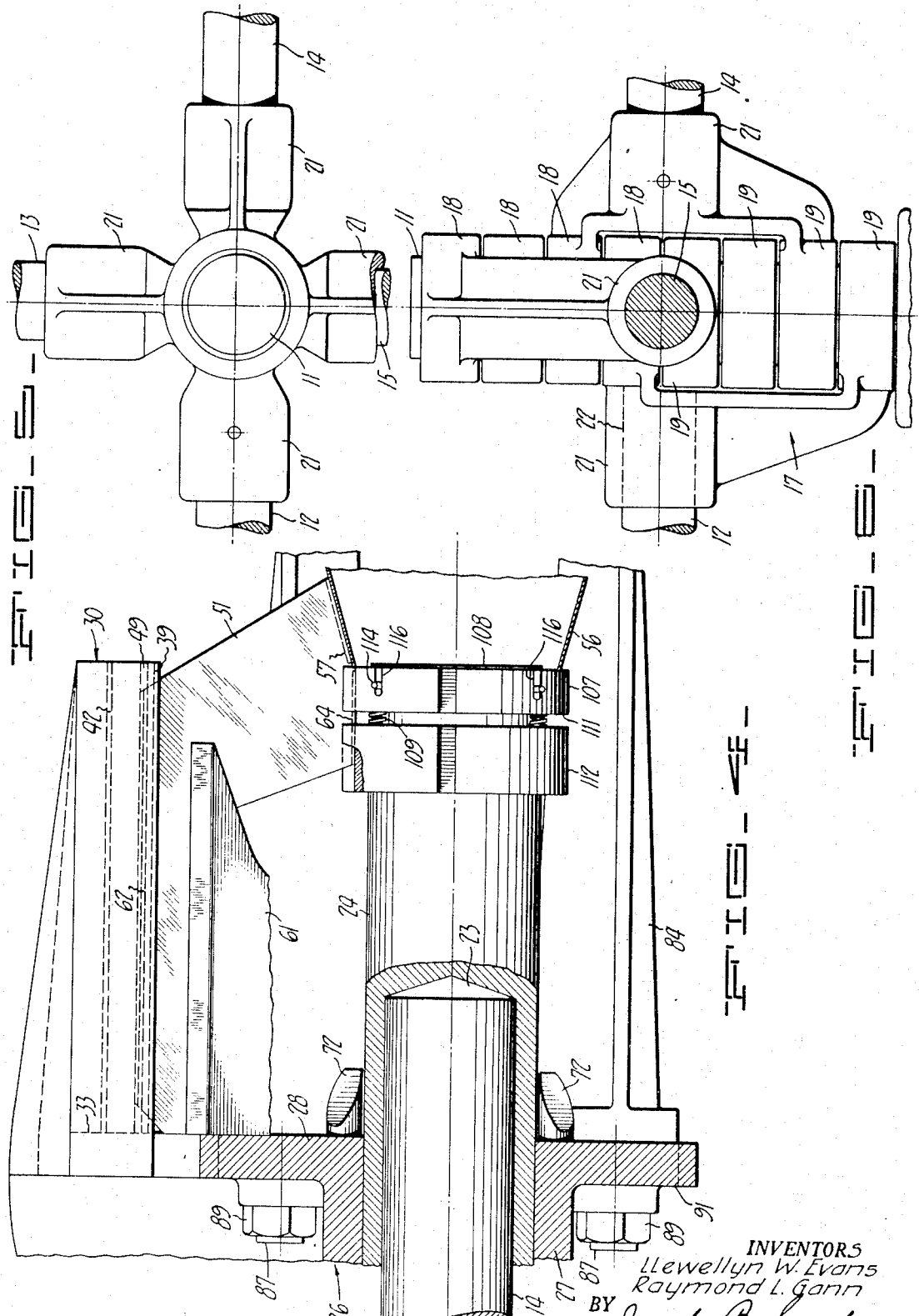
INVENTORS
Llewellyn W. Evans
Raymond L. Gann
BY
Joseph B. Gardner
ATTORNEY.

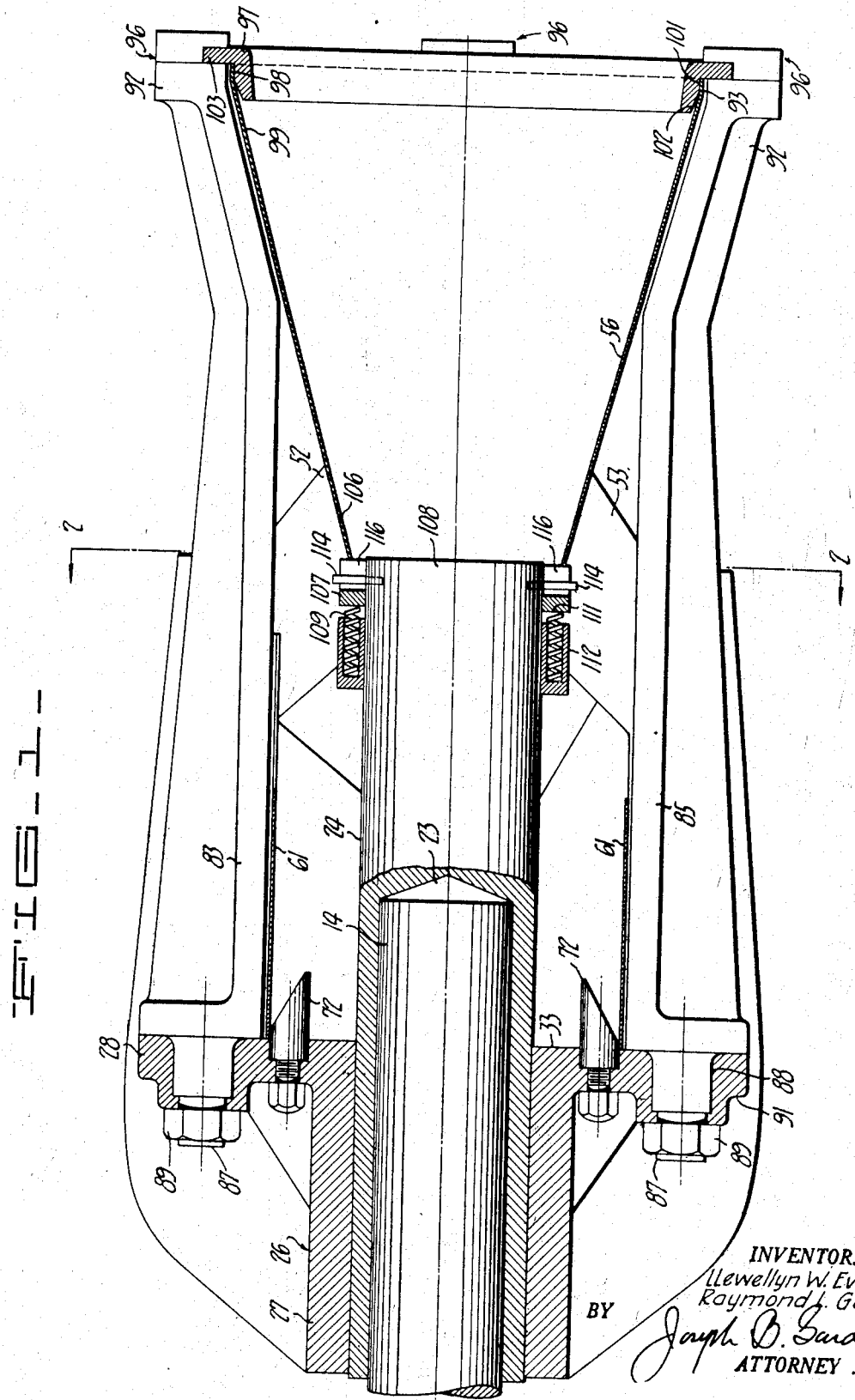

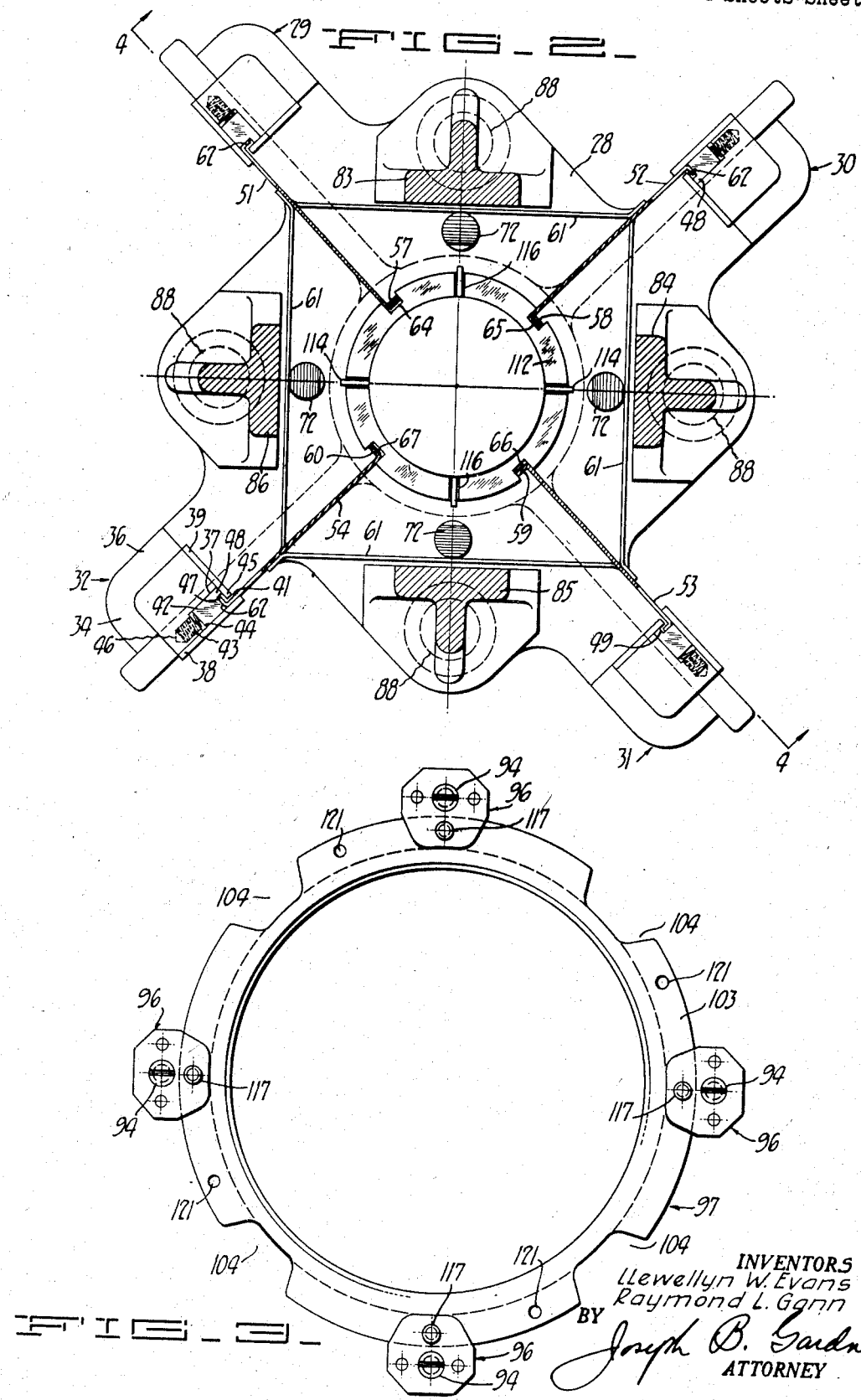

Feb. 22, 1944.  L. W. EVANS ET AL  2,342,392
LOCATING AND SUPPORTING DEVICE FOR BOMB PARTS AND THE LIKE
Filed May 16, 1941  4 Sheets-Sheet 4

INVENTOR.
Llewellyn W. Evans
BY Raymond L. Gann
Joseph B. Gardner
ATTORNEY.

Patented Feb. 22, 1944

2,342,392

UNITED STATES PATENT OFFICE 2,342,392

LOCATING AND SUPPORTING DEVICE FOR BOMB PARTS AND THE LIKE

Llewellyn W. Evans and Raymond L. Gann, Stockton, Calif., assignors to Rheem Manufacturing Company, Richmond, Calif., a corporation of California Application May 16, 1941, Serial No. 393,850

10 Claims. (Cl. 29—89)

The invention relates to devices adapted to locate, hold and support parts in assembled relation for welding or other attachment of the parts, and more particularly relates in the present instance to a machine for locating, holding and supporting fins such as for an aerial bomb in proper relation to each other and to a tail member such as the cone or end cylinder of a bomb or the like to permit welding of the fins to each other and to the tail member.

An object of the present invention is to provide a machine of the character described which is designed and adapted to permit quick and ready feeding of the several parts to be assembled into the machine for proper location and support of the parts and wherein the parts are properly located and held with appropriate areas thereof exposed for welding, riveting or other attachment and also wherein the assembled unit may be removed as a whole from the machine with minimum effort and removal of machine parts, all cooperating to provide an essentially mass production machine for effecting the operations aforesaid.

Another object of the invention is to provide a machine of the character above having a movable operating unit which is arranged for movement into and through a plurality of operating stations at which points the fin and tail members may be successively inserted into the machine, fabricated and removed as a completed unit in a series of efficient operations involving a plurality of operators each assigned to a particular operation, whereby a maximum speed and precision of manufacturing is obtained.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a longitudinal sectional view taken through one of the units of the device of my invention, with portions of a bomb assembled thereon.

Figure 2 is a transverse sectional view of one of the units taken on the line 2—2 of Figure 1.

Figure 3 is an end view of the device as viewed from the right of Figure 1.

Figure 4 is a fragmentary longitudinal sectional view of a unit taken on a different plane than Figure 1, the plane being indicated by the line 4—4 of Figure 2.

Figure 5 is a plan view on a smaller scale of the common support for the units.

Figure 8 is an end view of the unit as shown in Figure 7, portions being broken away to reduce the size of the figure.

The machine as depicted in the accompanying drawings briefly comprises a plurality of fin and bomb tail member locating, supporting and carrying units extending radially from and movable about a vertical axis and which are operatively moved into and through a plurality of operating stations positioned in circumferentially spaced relation around the machine. At such stations the fin and bomb tail members are successively inserted into the machine, welded and removed as a completed unit, the particular arrangement utilized being one wherein the fins are inserted at one station, welded together at the second station, the bomb tail member being inserted and welded to the assembled fins at the third station, and the completely fabricated unit being removed from the fourth station. Each of the locating and carrying units aforementioned is made up in the present instance of means providing a plurality of parallel longitudinally coextensive guides spaced equally about a central longitudinal horizontal axis and being adapted to engage and support the outer distal longitudinal edges of a plurality of radial fins, in combination with a center cone or cylinder locating and supporting means and means for supporting the webs of the fins, all of the several machine parts aforesaid being assembled for rotation as a unit about the aforesaid central longitudinal axis whereby the radial fins may be successively brought to an apparatus for welding the fins together and to the cone or cylinder.

Figure 6:
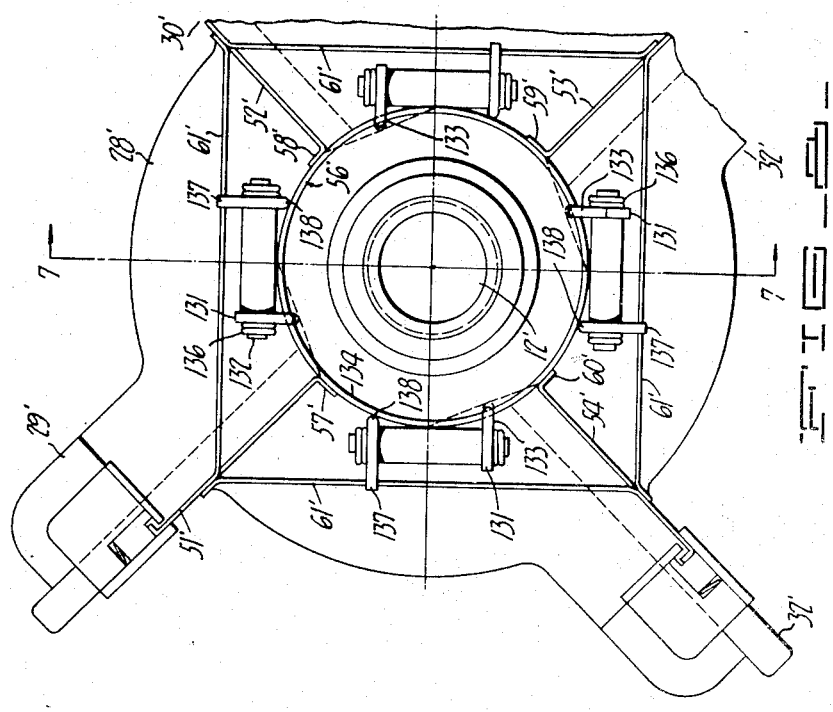
Figure 6 is a side view of the support shown in Figure 5.
Figure 7:
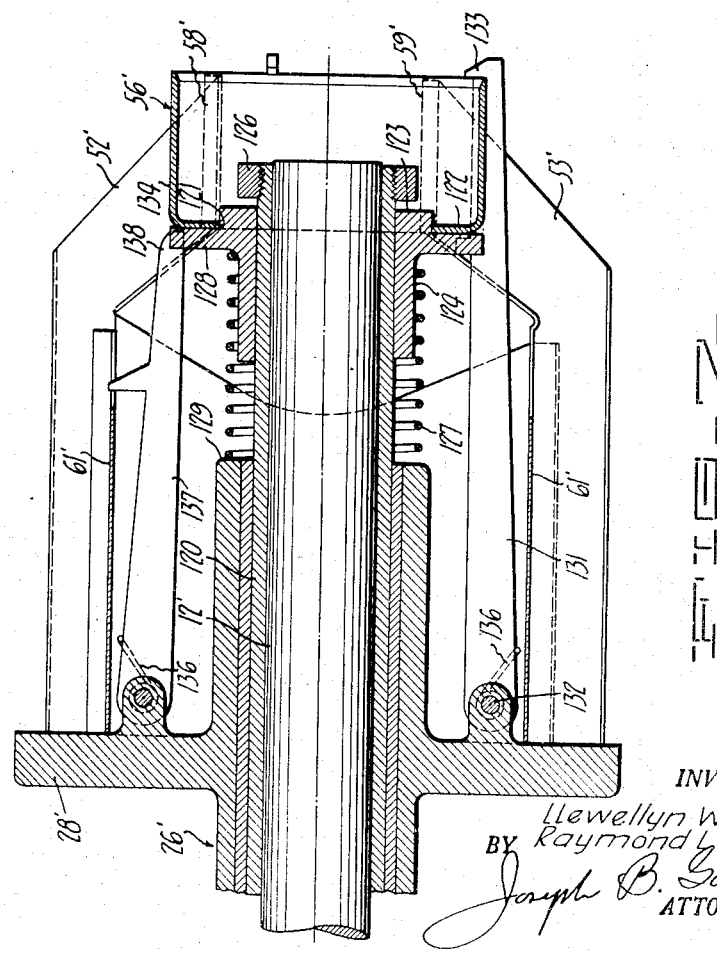
Figure 7 is a longitudinal sectional view of a modified form of a unit, the plane of the section being indicated on the line 7—7 of Figure 8.

The machine depicted in the accompanying drawings has been particularly designed and constructed as aforementioned for fabricating part of a bomb tail assembly for two different type bombs known as practice bombs (illustrated in Figures 1 to 6), and demolition bombs (illustrated in Figures 7 to 8). In each instance a plurality of radial fins 51—54 in the case of the practice bomb, and 51'—54' in the case of the demolition bomb, are secured together and are provided at their forward extremity with feet 57—60 and 57'—60', which are welded or otherwise secured to the tail of the bomb at 90° intervals around the circumference of the bomb, and the fin members extend radially outward from the longitudinal axis of the bomb from these feet and extend longitudinally rearward from the bomb tail. In the case of the practice bomb, the fin feet 57—60 are secured to a tail cone 56 provided on the bomb and in the case of the demolition bomb, the fin feet 57'—60' are secured to a tail cylinder 56' of the bomb. A substantial rearward portion 61 and 61' of each of the fins is bent away from the radial plane of the fin and at substantially 45° thereto and extends diagonally across and is welded or otherwise secured to the adjacent fin. In this manner the portion 61 and 61' of the fins form webs or stiffeners for the fin assembly, and when welded or otherwise secured as aforementioned provide a rigid rectangular fin unit. The radial outer longitudinal edges of the fins are formed with right-angularly arranged flanges 62 which serve to stiffen and reenforce the edge part of the fins and provide vanes for guiding purposes. In the case of the fins for the practice bomb, the forward radial portions 63 thereof, i. e., the portions of the fins having the feet 57—60, are also provided with a second set of rearwardly positioned feet 64—67 which are secured to a sleeve member (not shown) extending rearwardly from the cone 56. This sleeve member and the attachment of the feet 64—67 thereto is not involved in the present invention.

The entire machine is supported on and movable about a center vertical column 11, the specific means of attachment to this column being in the present instance a plurality of radial arms 12, 13, 14 and 15 which are secured to the column by means of hinge members 17. The latter, as illustrated in Figure 6, are bifurcated in part to provide axially aligned and spaced bearing portions 18 and 19 adapted for mounting on the column 11 and a right angularly extending part 21 having an opening 22 therethrough formed to receive the inner end of arms 12—15. The hinge members are here mounted on the column in an internesting arrangement of the bearing portions 18 and 19, as illustrated in Figure 6, and the right angularly arranged parts 21 of the several hinge members are set at various longitudinal positions of the members so as to lie in a substantially common transverse plane in assembled position. Preferably, the width of the right angularly extending part 21 of the hinge members is such as to permit a limited individual rotary movement of the hinge members about the column whereby certain of the arms may be moved in advance of others of the arms or all of the arms rotated together in order to accommodate the machine to variations in time taken in the manufacturing operations in the several successive rotated arm positions.

With reference to Figures 1 to 6, there are mounted on the radially outer ends of the arms 12—15 the fin and cone locating, supporting and carrying units aforementioned. These units are of identical construction and hence a description of one of them will suffice. As will be best seen from Figure 1, the outer ends of the arms 12—15 are cylindrical in form and are telescopically inserted into an end bore 23 provided in a larger cylindrical shaft or sleeve member 24 and a supporting member 26 is fixed to the member 24 for rotation therewith about the shaft ends of the arms. The member 26 here consists of a hub part 27 which is secured to the sleeve member 24 and from which extends an annular flange part 28 having formed integrally therewith a plurality of arms 29, 30, 31 and 32 which extend longitudinally from the outer face 33 of the flange at substantially equal distances from the central axis and in substantially 90° circumferential spacing about the axis. These arms, as will be seen in Figure 2, are of substantially L shaped form having right angularly arranged sides 34 and 36 which define a longitudinal recess 37 extending along the radial inner side of the arms, the arrangement being such that the recesses 37 of the several members all face the central axis of the unit. Mounted on the arm sides 34 and 36 are plates 38 and 39 which extend laterally across the recess 37 so as to substantially enclose the same, and as will be seen in Figure 2, the plate 39 has one longitudinal edge 45 thereof spaced from the adjacent right angular plate 38 so as to define therebetween a longitudinal slot 41 between the plates and communicated with the interior recess 37, the slots 41 providing, as will be seen in Figure 2, for the insertion and retention of the outer ends of the fins into the recess 37. Reciprocally mounted in the recess 37 for movement to and from the plate 39, is a pressure block 42 which is resiliently urged in the direction of the plate 39 by means of a helical spring 43 compressed against the outer face 44 of the block and carried within a recess 46 formed in the side 34 of the arm at the recess 37. The block 42 is formed at its radially inner side 47 with a forwardly projecting shoulder 48 which normally engages the plate 39 so as to hold the inner face 47 of the block in spaced relation to the plate to define therewith a longitudinal recess 49 for the receipt of the flanged edge 62 of the fin. As will be seen from the foregoing, the slot 41 is connected to the recess 47 and the slot and recess extend for the full longitudinal length of the arms 29—32 whereby flanged outer edges of the fins may be inserted into the slot and recess at the front ends of the arms and slid rearwardly until the rear end 69 of the fins engages the face 33 of the flange 28.

In addition to the edge support for the fins as above described, there is also provided a supporting means 71 for the web portions 61 of the fins so as to locate these web portions accurately across the adjacent fins, as illustrated in Figure 2. This means, as will be seen in Figures 1 and 2, consists of a plurality of pin members 72 which are secured to the flange 28 and extend forwardly thereof from the side 33 of the flange and are spaced circumferentially about the axis of the assembly, see Figure 2, at substantially right angles so as to engage and support the ends of the fin web portions 61. Preferably the forward ends of pins 72 are beveled, as shown in Figure 1, so as to facilitate the positioning of the fin web portions thereon.

Means for locating and supporting the cone 56 centrally of the fins 51—54 and in proper longitudinal relation thereto include a plurality of arms 83, 84, 85 and 86 which are secured to the flange 28 and extend longitudinally from the face 33 thereof in parallel coextensive relation and located circumferentially between the arms 29—32 and are positioned on equal radii with respect to the central axis of the unit and somewhat closer to such axis than are the arms 29—32. The means of attachment of the arms to the flange here includes a stud end 87 on each of the arms and which ends are inserted through a plurality of openings 88 in the flange 28 and secured in place by means of nuts 89 threaded on the stud ends against the opposite face 91 of the flange. As will be seen in Figure 1, the arms 83—86 extend considerably forwardly of the front ends of arms 29—32 and bevel outwardly towards their forward ends 92 so as to lie on a circle somewhat greater in diameter than the large diameter of the base end 93 of the cone. Secured to the front ends 92 of the arms 83—86, as by means of studs 94, are inwardly projecting lugs 96 which function to secure in place an end mounting ring 97 for the base end 93 of the cone. As will be seen in Figure 1, the base end 93 of the cone terminates in a cylindrical end portion 98 which lies immediately adjacent a beveled end portion 99 and the mounting ring 97 is formed with an external cylindrical surface 101 which fits into the cylindrical end 98 of the cone, and with an adjacent beveled exterior surface 102 which clears the beveled portion 99 of the cone, to thereby easily and firmly secure the mounting ring to the base end of the cone. The mounting ring 97 is additionally provided with a radially extending flange part 103 which is engaged by the lugs 96 aforementioned and is formed around the outer periphery thereof with a plurality of notches or recesses 104 slightly larger in transverse dimension than the lugs 96 so as to permit, upon alignment of the recesses 104 and lugs, a longitudinal movement of the ring 97 past the lugs, whereupon a rotational displacement of the ring relative to the lugs will position an un-notched portion of the flange 103 in opposed relation to the lugs to prevent endwise withdrawal of the ring.

The opposite smaller end 106 of the cone 56 is adapted to abut a cylindrical pressure ring plate 107 slidably mounted on the forward end portion 108 of shaft member 24 and normally reciprocally urged towards such ends by means of a helical spring 109 compressed between the rear face 111 of the plate and a collar 112 fixedly mounted on the member 24. The ring plate 107 is held against rotation on the member and guided for longitudinal reciprocation and held against endwise withdrawal by means of pins 114 fixed to the shaft member and engaging in longitudinal slots 116 in the ring member. In accordance with the foregoing, the mounting ring 97 is first inserted into the large base end of the cone 56 and then the small cone end 106 is inserted longitudinally between the arms 83—86 until the small cone end engages the pressure plate 107. The mounting ring is then rotated so as to align the notches 104 with the lugs 96 whereupon a further longitudinal movement of the cone and mounting ring may be effected against the resilient action of spring 109. After the mounting ring has been moved past the lugs 96, the ring is rotated to remove the notches from behind the lugs and then released forwardly, whereupon the pressure plate 107 will advance under the resilient urge of spring 109 to firmly clamp the cone between the mounting ring and the pressure plate. Preferably, and as here shown, means is provided for locating the mounting ring in a predetermined rotated position relative to the arms 83—86, and in the present instance such means includes a spring pressed spherical face detent 117 carried by the lugs and to engage with openings or recesses 121 provided in the flange part 103 of the mounting ring.

Preferably the periphery of the ring plate 107 is recessed, as shown in Figure 3, so as to receive the feet 64 of the fin which as aforementioned are subsequently attached to another portion of the tail of the bomb. The provision of these feet receiving recesses in the ring plate enables and insures the movement of the other feet 57 of the fins against the cone.

In the operation of the machine we prefer to initially insert the four fins at one rotated position of arms 12—15 and then rotate these arms through approximately 90° to a welding station where the fins are welded together. In this welding operation the entire head ends of the arms may be rotated as a unit, about the outer ends of the arms so as to successively bring the fin parts to be welded to a stationary welding machine, such as a spot welder. After the fins have been welded together, the arms are again rotated by approximately 90° so as to advance the welded fins to a third operating station where the cone 56 is inserted and the fin feet 57 welded thereto. At this station the fin and cone supporting and carrying unit may also be rotated so as to successively move the several fin feet to the welding machine. After the fins have been so welded to the cone, the arms are again swung by approximately 90° to a fourth station where the assembled units may be removed from the machine. In accordance with the foregoing, we have found that a very efficient operation of the machine can be obtained by assigning an operator to each of the foregoing stations, whereby each operator performs a single operation in the fabrication of the unit. In this connection and as previously pointed out, the arms 12—15 may be swung independently of each other so as to permit the movement of certain of the arms out of the stations aforesaid, while one or more of the other arms are being retained at their stations to in this manner permit variations in time taken by the several workmen for completing their operations.

A modified form of the apparatus is illustrated in Figures 7 and 8 wherein the apparatus is arranged as aforementioned for supporting the tail cylinder 56' of a demolition bomb and for additionally supporting the fins 51'—54' with the feet 57'—60' properly supported against the cylinder 56' for welding or otherwise securing thereto. In this form of the invention a main mounting member 26' similar to that described in connection with the first embodiment is used and is fixedly mounted on a sleeve 120 which is in turn rotatably mounted upon the outer end of one of the radial arms 12'; the member 26' is formed with a flanged part 28' from which extends a plurality of fin mounting arms 29'—32' which are essentially similar in form and function as the extending arms described in connection with the first embodiment.

The principal modification occurring in this form of the invention lies in the mode and structure of supporting the tail cylinder 56'. It will be seen from Figure 7 the cylinder 56' is formed with a central opening 121 in an end plate 122 of the cylinder which is mounted upon a shoulder part 123 of a collar member 124 slidably mounted for longitudinal reciprocation on the sleeve 120. Normally the collar 124 is urged to a forward position on the sleeve 120 against a stop, here in the form of a nut 126, by means of a helical spring 127 compressed between a flanged part 128 on the collar and an end face 129 of the member 26'. It will be further noted with reference to Figure 7 that the flange 128 serves as an end abutment and support for the end wall 122 of the cylinder 56'.

Means for holding the end cylinder 56' in place on the collar member 124 here includes a plurality of hook members 131 which are pivotally supported at one end 132 thereof to the supporting member 26' and extend longitudinally therefrom and are formed with an offset hook portion 133 at their opposite ends for engagement with the forward rim edge of the cylinder wall 134 of the member 56'. Resilient means is provided for normally urging the members 131 towards the axis of the assembly whereby these members will automatically move to a hooked position over the end of the cylinder when the latter is mounted upon the shoulder 123 and moved longitudinally against the resistance of spring 127 by a sufficient distance to clear the hooked ends 133. Any suitable spring means may be used for resiliently urging the hook arms 131 and as here shown, a suitable spring 136 is incorporated in the pivotal connection of the arm to the mounting member 26'.

To remove the cylinder 56', the hook members 131 are moved radially outward away from the cylinder and to conveniently effect this movement, the periphery of the flange 128 is of cam form, as illustrated in Figure 8, whereby upon rotation of the collar 124, the hook arms will be automatically displaced outwardly away from the cylinder.

Another feature of the modified form of construction is the mode and structure of supporting the web portions 61' of the fins. As illustrated in Figures 7 and 8, a second set of hook members 137 are pivoted to the supporting member 26' coincidentally with the hook members 131 and serve to engage the web portion 61' of the fins and to hold the same securely against the flange part 28' of the mounting body 26'. These hook members have a forwardly extending part 138 which rest on the cam at peripheral portions thereof spaced between the hook members 131, see Figure 8, whereby hook members 137 move in a reverse direction relative to hook members 131 upon rotation of the cam member.

We claim:

1. In a machine for assembling parts and supporting same for attachment in operative relation, a turret having a central axis, a plurality of carrier units, means mounting said units on said turret so that they may extend radially from and revolve together or relative to one another about said central axis for successive positioning at different operating positions spaced circumferentially about the machine and each said mounting means including supporting means mounted for rotation of said units about an axis radial to said center axis and stop means on each of said carrier units arranged for cooperation with the adjacent units for limiting the revolution of each unit about said central axis relative to the adjacent units.

2. In a machine for assembling bomb fin and body parts and supporting same for attachment in operative relation, a center support, a plurality of carrier units arranged for positioning radially of said support, individual means hingedly connecting each of said carrier units to said support for revolution of said units in substantially the same horizontal plane about said support for successive positioning of said units at different operating stations spaced circumferentially about the machine, said connecting means providing individual rotary movement of each of said units about said support relative to the other units, means on each of the units cooperating together to limit said revolution of the units relative to adjacent units, each of said units comprising means mounted for rotation about the radial axis of the unit and including a plurality of members for guiding said parts into operative assembled relation and holding same so positioned for rotation with said means.

3. A machine for locating and supporting the fins and body part of a bomb for fabrication wherein said fins are provided with web portions extending diagonally across the space between said fins and having outer longitudinal edges bending angularly to the web body portions, a plurality of parallel longitudinally extending guides spaced at equal radii from a central longitudinal axis and in equal circumferentially spaced relation to each other and formed with opposed portions corresponding in shape with and adapted to receive and support the outer longitudinal edges of said fins, abutment means mounted inwardly of said guides and circumferentially extending therebetween to engage and support said web portions, and a second abutment means concentric to said guides for locating and supporting said part concentric to said axis and in juxta-position to the inner ends of said fins.

4. A machine for locating and supporting the fins and body part of a bomb for fabrication wherein said fins are formed with right angularly extending flanges along the outer longitudinal edges thereof, comprising, a plurality of arms mounted in parallel longitudinally coextensive relation and spaced at equal radii from a central longitudinal axis and in equal circumferentially spaced relation to each other with longitudinally extending recesses facing said axis, means substantially enclosing said recesses and leaving in each instance a longitudinal slot facing said axis, a member reciprocally mounted in said recess, resilient means urging said member to the side of said recess facing said axis adjacent said slot, said slot being of a width adapted to receive said fins therethrough for engagement of the flange edge of said fins between said member and side of said recess facing said axis, and abutment means concentric to said guides for locating and supporting said part concentric to said axis and in juxta-position to the inner ends of said fins.

5. In a machine for locating and supporting the fins and body part of a bomb for fabrication wherein said fins are provided with web portions extending diagonally across the space between said fins, comprising, a horizontally extending arm supported at one end, means mounted on the free end of said arm for rotation about the longitudinal axis of said arm and providing a plurality of parallel longitudinally coextensive guides spaced at equal radii from said axis of said arm and in equal circumferentially spaced relation to each other and adapted to receive and support the outer longitudinal edges of said fins, a plurality of pin members mounted inwardly of said guides and connected to said means for rotation therewith about said axis mounted circumferentially between said guides to engage and support said web portions, and means connected to said first means for rotation therewith and concentric to said guides for locating and supporting said bomb body part concentric to said axis and in juxtaposition to the inner ends of said fins.

6. A machine for locating and supporting the fins and tail cone of a bomb for fabrication comprising, means providing a plurality of parallel longitudinally extending guides spaced at equal radii from a central longitudinal axis and in equal circumferentially spaced relation to each other and formed with opposed jaws adapted to receive and support the outer longitudinal edges of said fins, a plurality of arms supported by said means in parallel longitudinally coextensive relation parallel to said guides at equal radii from said axis and in equal circumferentially spaced relation to each other circumferentially between said guides, and a mounting ring adapted to engage and support the larger base end of said cone and detachably mounted to the ends of said arms for locating and supporting said cone concentric to said axis and in juxtaposition to the inner ends of said fins.

7. A machine for locating and supporting the fins and tail cone of a bomb for fabrication comprising, means providing a plurality of parallel longitudinally coextensive guides spaced at equal radii from a central longitudinal axis and in equal circumferentially spaced relation to each other and adapted to receive and support the outer longitudinal edges of said fins and further providing a cylindrical part concentric to said axis adjacent one end of said guides, a plurality of arms supported by said means in parallel longitudinally coextensive relation parallel to said guides at equal radii from said axis and in equal circumferentially spaced relaiton to each other circumferentially between said guides, a mounting ring adapted to engage the support the larger base end of said cone and detachably mounted to the ends of said arms for locating and supporting said cone concentric to said axis and in juxta-position to the inner ends of said fins, a cylindrical member slidably mounted for reciprocation on said cylindrical part and adapted to abut and center the smaller end of said cone, and spring means resiliently urging said cylindrical member in the direction of the outer ends of said arms for resiliently clamping said cone between said cylindrical member and said mounting ring.

8. A machine for locating and supporting the fins and tail cylinder of a bomb for fabrication comprising, a plurality of parallel longitudinally guides spaced at equal radii from a central longitudinal axis and in equal circumferentially spaced relation to each other and adapted to receive and support the outer longitudinal edges of said fins, abutment means concentric to said axis for holding one end of said cylinder in juxta-position to the inner ends of said fins, and a hook member mounted to move radially and releasably engageable with the opposite end of said cylinder for holding the same in position.

9. A machine for locating and supporting the fins and body part of a bomb for fabrication wherein said fins are provided with web portions extending diagonally across the space between said fins, a plurality of parallel longitudinally extending guides spaced at equal radii from a central longitudinal axis and in equal circumferentially spaced relation to each other and provided with jaws adapted to receive and support the outer longitudinal edges of said fins, abutment means concentric to said guides for locating and supporting said part concentric to said axis and in juxta-position to the inner ends of said fins, and a plurality of hook members pivotally mounted to move radially into supporting engagement with said web portions.

10. A machine for locating and supporting the fins and tail cylinder of a bomb for fabrication comprising, means providing a plurality of parallel longitudinal guides spaced at equal radii from a central longitudinal axis and in equal circumferentially spaced relation to each other and adapted to receive and support the outer longitudinal edges of said fins, abutment means concentric to said axis for supporting one end of said cylinder in juxta-position to the inner ends of said fins, a radially movable hook member releasably engageable with the opposite end of said cylinder for holding the same in position, resilient means urging said hook member outwardly to engage with said cylinder, and cam means for retracting said hook member and releasing same from said cylinder.

LLEWELLYN W. EVANS.
RAYMOND L. GANN.